United States Patent
Teng et al.

(10) Patent No.: US 10,134,203 B2
(45) Date of Patent: Nov. 20, 2018

(54) NETWORKED MONITORING SYSTEM FOR AUTOMOBILES

(71) Applicant: Dexen Industries, Inc., Santa Fe Springs, CA (US)

(72) Inventors: Yu-Shan Teng, Santa Fe Springs, CA (US); Eric Simmon Cho, Santa Fe Springs, CA (US); Alberto Hernandez-Albarran, Santa Fe Springs, CA (US); Haroldo Rene Gourian, Santa Fe Springs, CA (US)

(73) Assignee: Dexen Industries, Inc, Santa Fe Springs, CA (US)

( * ) Notice: Subject to any disclaimer, the term of this patent is extended or adjusted under 35 U.S.C. 154(b) by 806 days.

(21) Appl. No.: 14/317,910

(22) Filed: Jun. 27, 2014

(65) Prior Publication Data

US 2014/0324278 A1  Oct. 30, 2014

Related U.S. Application Data

(63) Continuation-in-part of application No. 13/849,470, filed on Mar. 23, 2013, now abandoned.

(51) Int. Cl.
| | |
|---|---|
| *G06F 15/16* | (2006.01) |
| *G07C 5/00* | (2006.01) |
| *G06Q 50/30* | (2012.01) |
| *G06Q 10/00* | (2012.01) |
| *G06Q 10/06* | (2012.01) |

(52) U.S. Cl.
CPC ............. *G07C 5/008* (2013.01); *G06Q 10/20* (2013.01); *G06Q 50/30* (2013.01); *G06Q 10/06311* (2013.01); *G07C 5/006* (2013.01)

(58) Field of Classification Search
CPC ........ G06Q 10/06; G06Q 10/20; G06Q 50/30; H04L 67/306; G06F 11/00; G06F 11/0748; G06F 11/22
USPC ........................................................ 709/217
See application file for complete search history.

(56) References Cited

U.S. PATENT DOCUMENTS

| | | | |
|---|---|---|---|
| 6,330,499 B1 * | 12/2001 | Chou ..................... | G07C 5/008 |
| | | | 701/31.4 |
| 2005/0125102 A1 * | 6/2005 | Nichols .................. | G05B 15/02 |
| | | | 700/276 |

(Continued)

*Primary Examiner* — Joseph E Avellino
*Assistant Examiner* — Patrick Ngankam
(74) *Attorney, Agent, or Firm* — Mark Terry

(57) ABSTRACT

A system for providing monitoring of automobiles includes a database comprising a plurality of automobile records, and a plurality of technician records. The system further includes a computing device comprising a network interface device, a sensor coupled to the automobile and a processor for reading the sensor data from the sensor and transmitting the sensor data to a server. The system further includes a server for receiving the sensor data, finding a technician within the vicinity that can service the automobile and sending a message to the technician including the sensor data and location of the automobile, so that the technician may service the automobile. The system is further configured for identifying the velocity of the automobile; correlating the velocity of the automobile with the speed limit associated with the automobile's location; assigning a level of severity to the traffic; and sending a message to customers.

20 Claims, 9 Drawing Sheets

(56) References Cited

U.S. PATENT DOCUMENTS

2012/0083995 A1* 4/2012 Vorona ................. G08G 1/0104
                                                            701/119
2013/0018803 A1* 1/2013 Challu ................... G06Q 10/06
                                                            705/304
2014/0278653 A1* 9/2014 Cocanougher ..............................
                                                      G06Q 10/063116
                                                            705/7.16

* cited by examiner

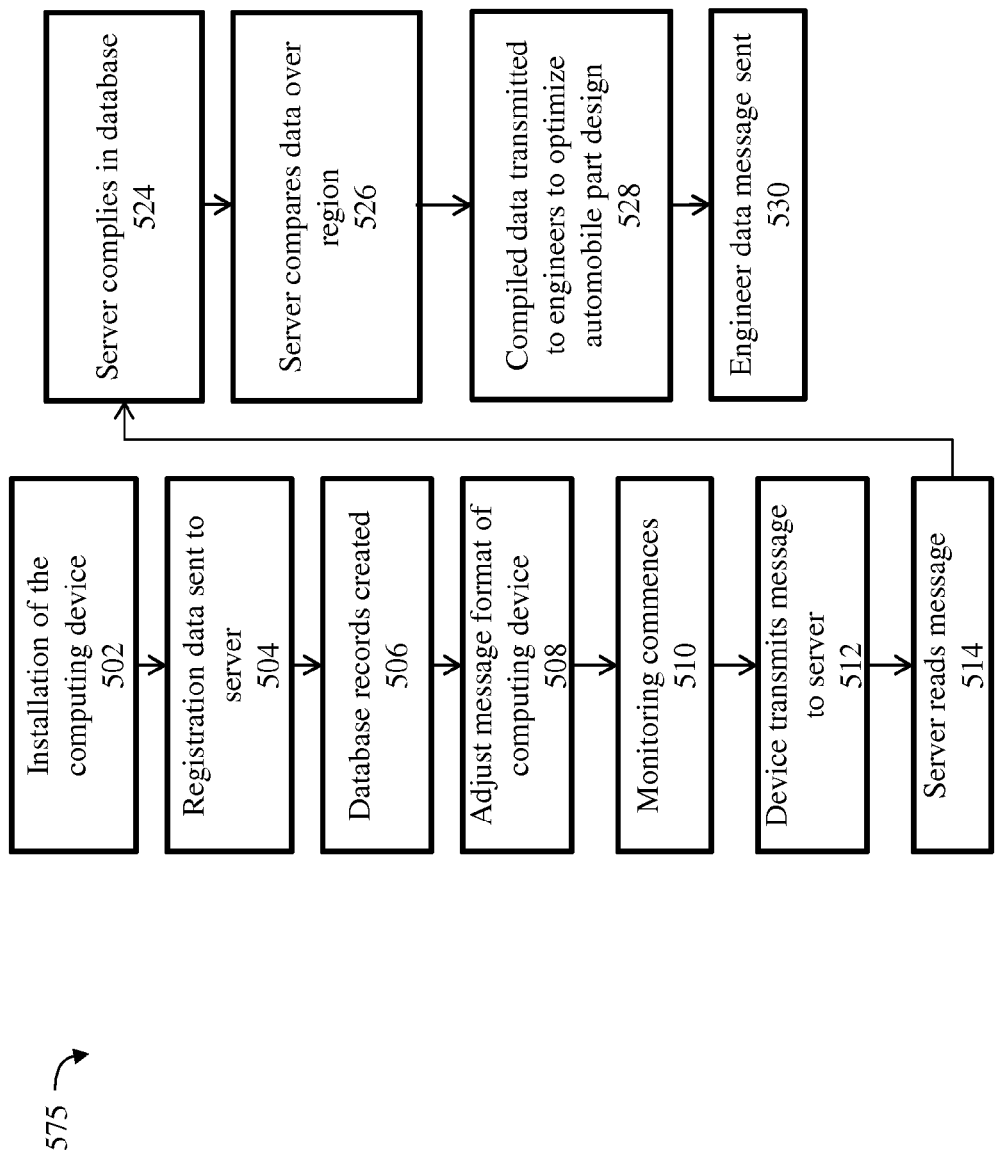

NETWORKED MONITORING SYSTEM FOR AUTOMOBILES

CROSS-REFERENCE TO RELATED APPLICATIONS

The present application is a continuation-in-part of U.S. patent application Ser. No. 13/849,470 filed on Mar. 23, 2013, which is hereby incorporated by reference as if fully set forth herein.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of automobile monitoring systems and, more specifically, to monitoring and maintaining of automobiles using telecommunications networks.

BACKGROUND

The manufacturing, servicing and operation of automobiles comprise a worldwide industry in modern society. One of the most important sectors of the automobile industry involves the servicing and repair of automobiles. A variety of problems, however, are associated with the process of servicing and repairing automobiles. Often, consumers become aware of problems with their automobile only when their automobile breaks down. This motivates the consumer to start a search for a servicer or technician of automobiles, which often comprises looking for a technician on the Internet, during which time the consumer is without a properly functioning automobile, which can be dangerous and inconvenient.

The process of finding an appropriate automobile technician to service and repair an automobile can also be hampered by schedules and distances. A consumer may be successful in finding an automobile technician with the appropriate skills but the automobile technician may not have the time in his schedule to service the automobile or the automobile technician and may simply be located too far away from the consumer to make it feasible to service the automobile.

Another problem associated with the servicing of automobiles involves the need for replacement parts. Usually, an automobile technician must personally inspect the automobile to determine which parts, if any, require replacement. After this determination is made, the automobile technician or mechanic must leave the premises or put in an order to acquire the replacement parts identified before returning to service the automobile. This process prolongs the service experience and lengthens the time the consumer is without a properly functioning automobile.

Therefore, a need exists for improvements over the prior art, and more particularly for methods and systems that reduce the complexity, cost and time associated with detecting problems of an automobile, finding an appropriate technician to service the automobile and servicing the automobile.

SUMMARY

A system and method that facilitates the monitoring of automobiles communicatively coupled with a communications network is provided. This summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope. Additionally, it should be noted that addition to the monitoring of automobiles.

In one embodiment, a distributed system for providing monitoring of automobiles includes 1) a database connected to a communications network, the database comprising: a) a plurality of automobile records, wherein each automobile record includes an automobile unique identifier, automobile owner contact information, an automobile message format, automobile sensor parameter data; b) a plurality of technician records, wherein each technician record includes technician contact information and a list of automobile types representing automobiles serviced by the technician; and c) wherein each technician record includes technician contact information and a list of automobile types representing automobiles serviced by the technician; 2) a computing device connected to engine control unit (ECU) of an automobile, the computing device comprising; a network interface device for connecting the computing device to the communications network; a sensor for receiving or detecting at least one signal emanating from the ECU and generating corresponding sensor data; a processor for reading the sensor data from the sensor and transmitting a message over the communications network via the network interface device, wherein the message is formatted according to the message format of the computing device and wherein the message includes the sensor data and an automobile unique identifier.

The distributed system further includes a server comprising: a network interface device for connecting the server to the communications network; a processor configured for: a) receiving the message from the computing device via the network interface device, b) reading the automobile unique identifier in the message, c) searching for and identifying an automobile record in the database that matches the automobile unique identifier, d) reading from the automobile record the automobile owner contact information, automobile message format, automobile sensor parameter data and the first automobile type, e) reading the sensor data from the message according to the automobile message format and the automobile sensor parameter data, f) searching for and identifying a technician record in the database having an address in the technician contact information within a predefined area of an address of automobile contact information, and having an automobile type that matches the first automobile type, and g) sending, via the network interface device, a message to the technician using the technician contact information, wherein the message includes the sensor data, the first automobile type, and the automobile owner contact information.

BRIEF DESCRIPTION OF DRAWINGS

The accompanying drawings, which are incorporated in and constitute a part of this disclosure, illustrate various example embodiments. In the drawings:

FIG. 5C is another flow chart showing the control flow of the process for monitoring automobiles and facilitating maintenance and repair of such automobiles over the communications network, according to an example embodiment;

DETAILED DESCRIPTION

Figure 1:
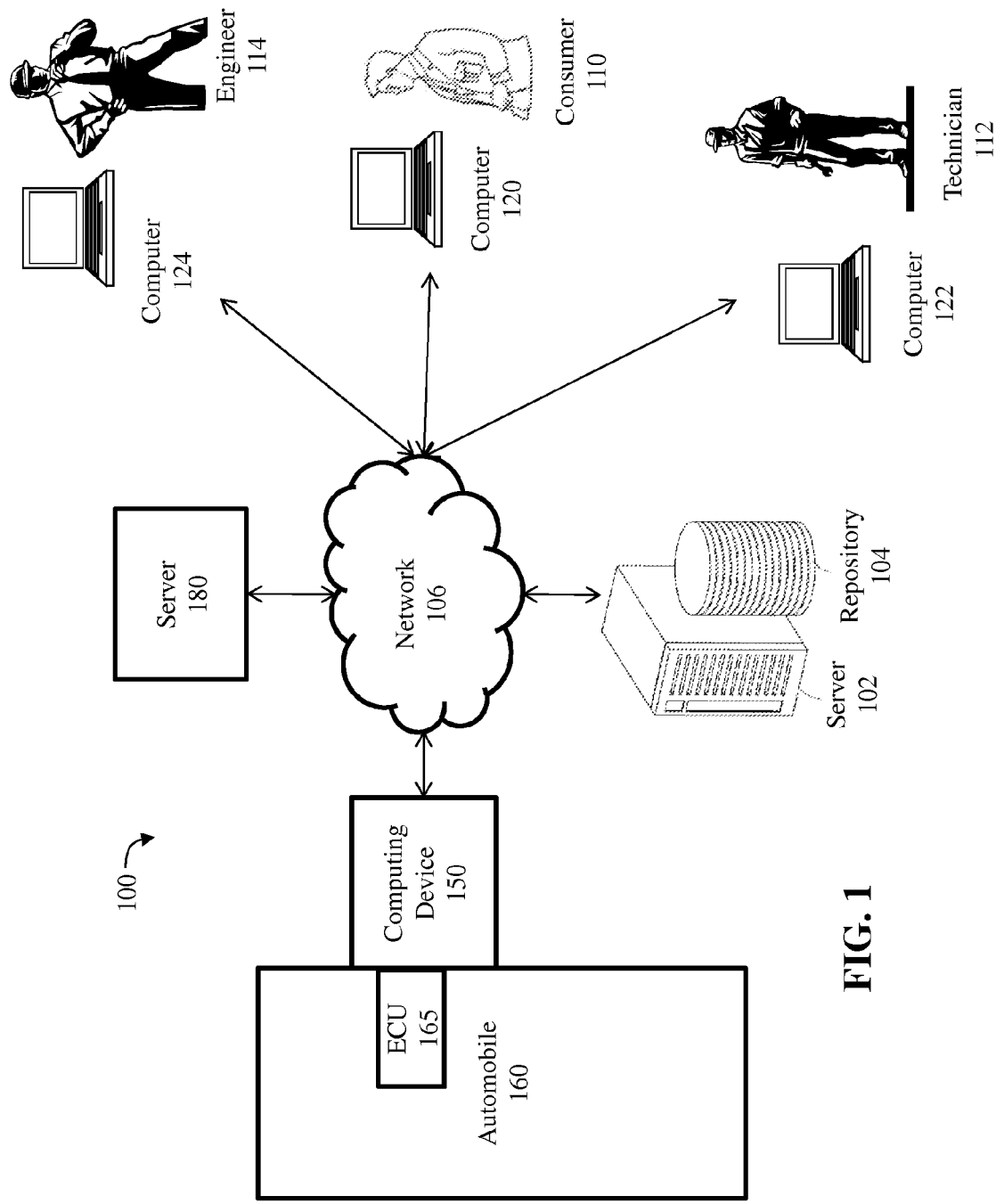
FIG. 1 is a diagram of an operating environment that supports a process for monitoring automobiles and facilitating maintenance and repair of such automobiles over a communications network, according to an example embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims. It should also be noted that this invention is not limited to only automobiles. The method and systems of the invention can also be used in aircraft, vessels and any other motorized vehicle.

The methods and systems of the invention reduce the complexity, cost and time associated with detecting problems with an automobile, finding an appropriate automobile technician or mechanic to service and repair the automobile. First, the invention allows consumers to become aware of problems with their automobile before the automobile fails or becomes unavailable. The invention also automates the process of finding a servicer of the automobile, thereby eliminating the need to use the internet, local telephone books or word of mouth in finding a service technician that possesses the skills to service every automobile make or type. This cuts down or eliminates the amount of time the consumer is without a properly functioning automobile.

The methods and systems of the invention also can be used to notify the closest service station or dealer and information about the location of the automobile and information about the particular motor vehicle to be serviced or repaired. The system can also use mileage information of the automobile as a pre-warning system to alert the closest subscribing dealer or service station for potential parts for replacement or failure, to send information regarding the warranty of the car, and for sending advertising and promotional material to the owner.

Systems and methods of the invention can also be used to monitor the local traffic patterns and can be used to streamline traffic based upon information gathered from automobiles. For example, a central server may collect traffic data and send traffic warnings or alternative routes to the automotive computers of users that are currently using a navigation system to navigate. The data gathered from the automobiles can also be used by manufacturers as engineering references for designing and manufacturing automobiles in the future. The data can also be used by parts suppliers for overall demographics and marketing campaigns. The data gathered can also be used to disseminate real time information to customers about potential traffic problems so that the consumer can avoid such problems.

Further, the invention facilitates the process of finding an appropriate automobile technician to service and repair an automobile by automating the process of finding an automobile technician with the appropriate skills, an automobile technician that has the time in his schedule to service the consumer's system, and an automobile technician that is located within the vicinity of the consumer. Also, the invention eliminates the requirement of an elongated wait time to determine what is wrong with the automobile, identify the replacement part needed, travelling to pick up the replacement part and replacing the part in the automobile system. By reporting to the technician exactly which replacement part is needed before the automobile is brought into the shop, the technician may pick up the replacement part before the customer travels to the repair shop and therefore potentially repairing the system in less time. This process shortens the service experience and shortens the time the consumer is without a functioning automobile. The system of this invention also opens up the ability for repair technicians to travel to a vehicle's location with the appropriate parts required to fix the vehicle where the vehicle is located without the need of having to travel for replacement parts and then return to the vehicle.

FIG. 1 is a diagram of an operating environment or system 100 that supports a process for automobiles and facilitating service of such automobiles over a communications network 106, according to an example embodiment. The environment 100 may comprise a computing device 150, computers 120, 122, 124 and server 180, all of which may communicate with server 102 via a communications network 106. Computing device 150, computers 120, 122, 124, may comprise any computing devices, such as integrated circuits, printed circuit boards, processors, ASICs, PCBs, cellular telephones, smart phones, tablet computers, desktop computers, laptops, and game consoles, for example. Computing device 150 and computers 120, 122, 124 may be connected either wirelessly or in a wired or fiber optic form to the communications network 106. Communications network 106 may one or more packet switched networks, such as the Internet, or any local area networks, wide area networks, enterprise private networks, cellular networks, phone networks, mobile communications networks, or any combination of the above. In one embodiment, computing device 150 is a programmable logic controller or PLC.

Server 102 includes a software engine that delivers applications, data, program code and other information to networked devices 120, 122, 124. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server or a database that adheres to the NoSQL paradigm. Mobile computing devices 120, 122, 124 may also each include databases. The database 104 may serve sensor data, as well as related information, used by server 102 and mobile computing devices 120, 122, 124 during the course of operation of the invention.

Computing device 150, electronic control unit (ECU) 165, computers 120, 122, 124 and servers 102, 180 may each include program logic comprising computer source code, scripting language code or interpreted language code that perform various functions of the present invention. In one embodiment, the aforementioned program logic may comprise program module 607 in FIG. 6. It should be noted that although FIG. 1 shows only one computing device 150, one ECU 165, three client computing devices 120, 122, 124 and one server 102, the system of the present invention supports any number of computing devices, ECUs, servers and client computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Various types of data may be stored in the database 104 of server 102. For example, the database 104 may store one or more records for each computing device 150, i.e., an automobile record. An automobile record may include an automobile unique identifier, automobile owner or user contact information, an automobile message format, automobile sensor parameter data and an automobile device type. An automobile type includes the year, make, model, edition, or any other feature or classification that further identifies the automobile. An automobile unique identifier may be an alphanumeric value that is unique to a particular computing device 150. Automobile owner or user contact information may include the contact information for the person or entity that owns, possesses, or is responsible for the repair and maintenance of the automobile, such as the contact information for the person that owns the automobile and where the automobile 160 is registered. Additionally, the automobile owner contact information may include the contact information for the person or entity that most regularly drives the automobile. Automobile owner contact information may include name, address, telephone number, email address, GPS coordinates, etc. Alternatively, instead of storing automobile owner contact information in a device record, the device record may store the physical location where the automobile is located at any point in time, which may be a geographical address or GPS coordinates representing the location of the automobile.

A device message format defines the format of messages sent by the computing device 150. An example of a device message format includes a map that defines each bit of a message (or a data packet comprising a portion of a message) and what data is represented by each bit of the message or data packet.

The Electrical Control Unit (ECU) is a generic term for an embedded system or computer that controls one or more of the electrical systems in a car. The ECU 165 can monitor and control various functions and systems of an automobile 160. An ECU can have various embodiments depending on the make and model of an automobile. In one embodiment, the ECU has a microprocessor, random access, read only memory, and the input/output interface. The ECU can also include analog to digital converters to read the outputs of the various sensors in automobiles. The ECU's Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed. However, this is not meant to be a limitation and other embodiments may be used.

The ECU monitors can monitor the ignition's timing, idle speed control system, fuel injection system, tire pressure, oil pressure, mileage, throttle position, air temperature, engine RPM, crankshaft position, engine load, engine coolant temperature etc. The ECU can store the information received from monitoring the various sensors in the automobiles in the ECU's memory. As mentioned above, the ECU may also include program logic comprising computer source code, scripting language code or interpreted language code that perform various functions.

Most ECUs are located inside a vehicle behind the dashboard, under the passengers or driver seat, or behind the passenger side kick panel. Some manufacturers may still position the ECU in the engine compartment. The sensors, switches and actuators are devices that also include oxygen sensors, coolant temperature sensors, and throttle position sensors, fuel injectors that are located throughout the engine, and are connected by electrical wiring to the ECU 165. The ECU 165 receives information in the form of signals from the sensors and switches located throughout the engine and stores this information as code. The computer of the ECU compares the actual values from these sensors with reference values that are programmed in its computer storage media.

Automobile sensor parameter data defines the sensor data that will be provided by the sensors in the automobiles and the parameters for each sensor datum. In one example, automobile sensor parameter data may specify that a message will specify the value of the signal, code, troubleshooting messages, and fault code stored in the memory of the ECU 165. In another example the automobile parameter data may further specify that a device message will specify a mileage reading, a range of values associated with the maintenance required for certain mileage readings, a level of carbon monoxide emission of the automobile reading, and a range of values for acceptable omissions readings. The automobile sensor parameter data may further specify that a device message will specify environmental data acquired from the sensor 204, such as temperature, humidity, moisture, barometric pressure etc.

The automobile sensor parameter data may further specify that a device message will specify the GPS coordinates, velocity, or roadmap location of the automobile. The GPS coordinates and velocity can also be acquired through the global positioning system of the automobile or the GPS coordinates and velocity can be acquired from a GPS module 206 located in the computing device 150.

A first automobile type may be an alphanumeric value that indicates a model number, version number, make description, year, edition and other identifying features and classifications of the automobile 160. An automobile record may also include demographic data for an automobile owner and a distance or geographic range that defines a geographic area that shall be searched when seeking a technician to service the device.

An automobile record may also include the maintenance or repairs that have been performed on the vehicle to date, such as date of last oil change, date of any previous maintenance on the automobile, and the date of expiration of warranty on any parts of vehicle.

In one embodiment, an automobile record may also include a map or table that defines what certain fault codes, malfunction codes, or troubleshooting messages mean. The map or table may describe or define the reason for a malfunction or fault, including the malfunctioning part or component. For example, the chart may specify the code or signal that corresponds with a malfunctioning spark plug, which requires replacement. The map or table may further include severity indicator that indicates the severity or urgency of a problem exhibited by the automobile 160. A low severity indicator may indicate that a notice should be sent to the technician 112 either once or once every period of time, while a more severe emergency indicator may indicate that a notice or alert should be sent to the technician 112 periodically over a short period of time or more frequently. The severity indicator may be a textual value or it may be a numerical value in a continuous range from 1 to 100. In another embodiment, the map or table described above is not located in the automobile record but rather is located in a separate automobile profile record, wherein the automobile record includes a pointer to the separate automobile profile record (and/or the automobile profile record includes a pointer to the automobile record).

In another example, the database 104 may store one or more records for each technician 112, i.e., a technician record. A technician record may include technician contact information (such as name, address, telephone number, email address, GPS coordinates, etc.) and a list of automobile types that represent automobiles serviced by the technician. I.e., the list of automobiles types represent the service skills possessed by a particular technician regarding his ability to service certain types of automobiles. A technician record may also include a unique identifier for a technician, demographic data for a technician and a distance or geographic range that defines a geographic range or area that is serviced by the technician. In yet another example, the database 104 may store one or more automobile profile records wherein each such record may include a map or table that defines what certain fault codes, malfunction codes or signals from the ECU mean.

In one embodiment, an automobile record may include any of the data found in a technician record, or an automobile record may include a link to one or more technician records, such that it is predefined which technician or technicians are slated or assigned to service the automobile of the automobile record. In another embodiment, a technician record may include any of the data found in an automobile record, or a technician record may include a link to one or more automobile records, such that it is predefined which technician or technicians are slated or assigned to service the automobile (s) of the automobile record(s). In another example, the database 104 may store one or more records for each engineer 114, i.e., an engineer record. A engineer record may include engineer or manufacturer contact information (such as name, address, telephone number, email address, GPS coordinates, etc.) and a list of automobile types that represent automobiles engineered, manufactured, produced, advertised and marketed by the engineer or any third party associated with the engineer, and a list of automobile parts that represent automobiles engineered, manufactured, produced, advertised and marketed by the engineer or associated with the engineer. The list of automobiles types in a engineer record can represent the list of automobiles that the engineer or third party designs, engineers, manufactures, produces, advertises and markets and sells.

An engineer record may also include a unique identifier for an engineer, a distance or geographic range that defines a geographic range or area that is within the engineer's territory.

In one embodiment, an automobile record may include any of the data found in a engineer record, or an automobile record may include a link to one or more engineer records, such that it is predefined which engineer or other third parties are slated or assigned to design, engineer, manufacture, produce, advertise, market and sell the automobile of the automobile record. In another embodiment, an engineer record may include any of the data found in an automobile record, or an engineer record may include a link to one or more automobile records, such that it is predefined which engineer, engineers or third parties are slated or assigned to service the automobile (s) of the automobile record(s). The notices or alerts may also be sent to the consumer 110 or engineers. Similar to the alerts sent to a technician 112, the alerts or notices sent to the engineers 114 and consumers 110 provide valuable information. The alerts or notices sent to the consumer 110 allows the consumer to identify if a problem that exists before it causes more damage to the automobile or makes the automobile not drivable or unusable. The alerts, messages or notices may also be used to send other information to the consumer 110 such as traffic reports, weather reports and warnings, warranty information, and advertising and promotional material.

In one embodiment, an automobile record may also include the GPS coordinates and velocity information of the automobile, which such GPS location can be mapped to a location on a road map. The velocity of the automobile can be compared with the speed limit of the location or GPS location of the automobile on a roadmap to determine the level of or severity of traffic. For example if the velocity of the automobiles using the system in a geographical area is 0 mph and the area has a speed limit of 75 mph and the automobiles are functioning properly, then the traffic in the area is high. Traffic alerts or messages can be sent to consumers so that consumers 110 can avoid traffic. Additionally, the traffic data can be compiled and used to streamline or reduce traffic.

Figure 2:
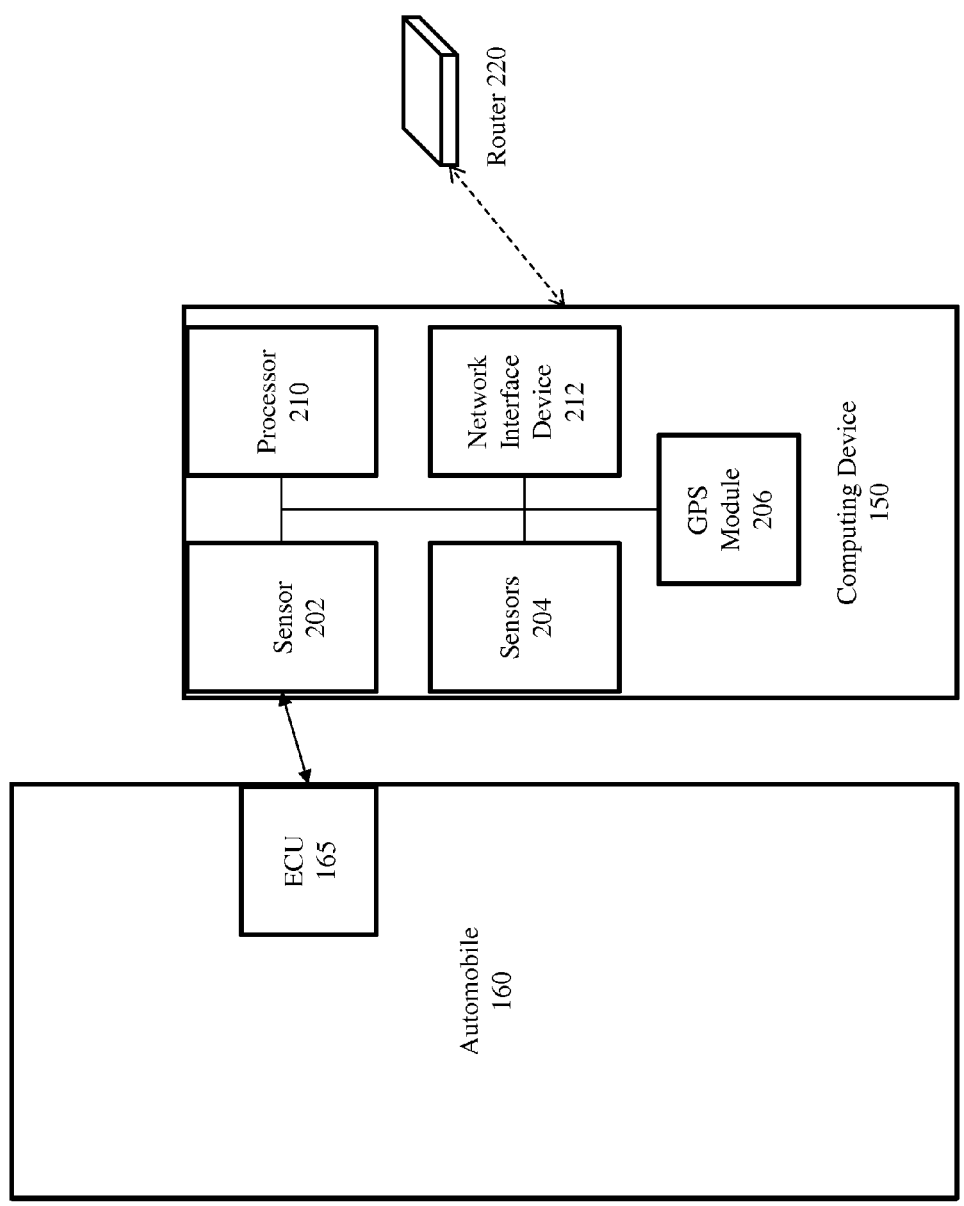
FIG. 2 is a block diagram showing the main components of computing device for monitoring automobiles using the communications network, according to an example embodiment.

FIG. 2 is a block diagram showing the main components of a computing device 150 for monitoring automobiles using the communications network 106, according to an example embodiment. FIG. 2 shows that computing device 150 includes a processor 210 and a network interface device 212, as described more fully in FIG. 6 below. A network interface device 212 (also known as a network interface card, network adapter, LAN adapter and by similar terms) is a computer hardware component that connects a computer to a computer network, such as network 106. The network interface device 212 implements the electronic circuitry required to communicate using a communications protocol such as Ethernet, Wi-Fi, Zig Bee or Token Ring. In one embodiment, the network interface device 212 may connect (in either a wired or wireless manner) to a router 220, which may be located at or near the home of the owner of the automobile or to various businesses. Alternatively, the router may be included in the computing device 150.

FIG. 2 also shows that computing device 150 may include one or more sensors 202 that detect signals, code, troubleshooting messages, or fault code from the ECU. In another embodiment (not shown), and with older model ECUs, the sensors may comprise optical sensors that sense light or other electromagnetic emissions emitted from LEDs (not shown) located on the ECU, which such LEDs can be used especially. FIG. 2 also shows that computing device 150 may include one or more environmental sensors 204, which may comprise temperature sensors, humidity sensors, carbon monoxide sensors, water sensors, barometric pressure sensors, moisture sensors, acceleration sensors, velocity sensors, or the like. The computing device 150 may also include a GPS module 206. GPS module 206 contains electrical circuitry for receiving a GPS signal and corresponding position information and velocity information. Alternatively, the GPS module 206 can be integral with the automobile's circuitry and such positioning and velocity data can be transmitted from the GPS module in the automobile to, and detected or received by the sensor 202. The sensors 202, 204 and GPS module 206 may report sensor, positioning and velocity data to the processor 210, which then transmits the sensor data to the server 102 via network interface device 212.

In one embodiment, computing device 150 has a direct data communication connection with the ECU 165 of the automobile 160, such as a serial data port connection, which may be a physical wire interface through which data transfers. Examples of a serial data port connection include FireWire and USB. In this embodiment, the computing device 150 receives message from the ECU 165 of the automobile 160, wherein the message may include troubleshooting messages, sensor readings, fault codes, malfunction codes and the like. It should be noted that if the GPS module is integral with the automobile 160, the computing device 150 can receive the GPS positional and velocity data as well.

Figure 3:
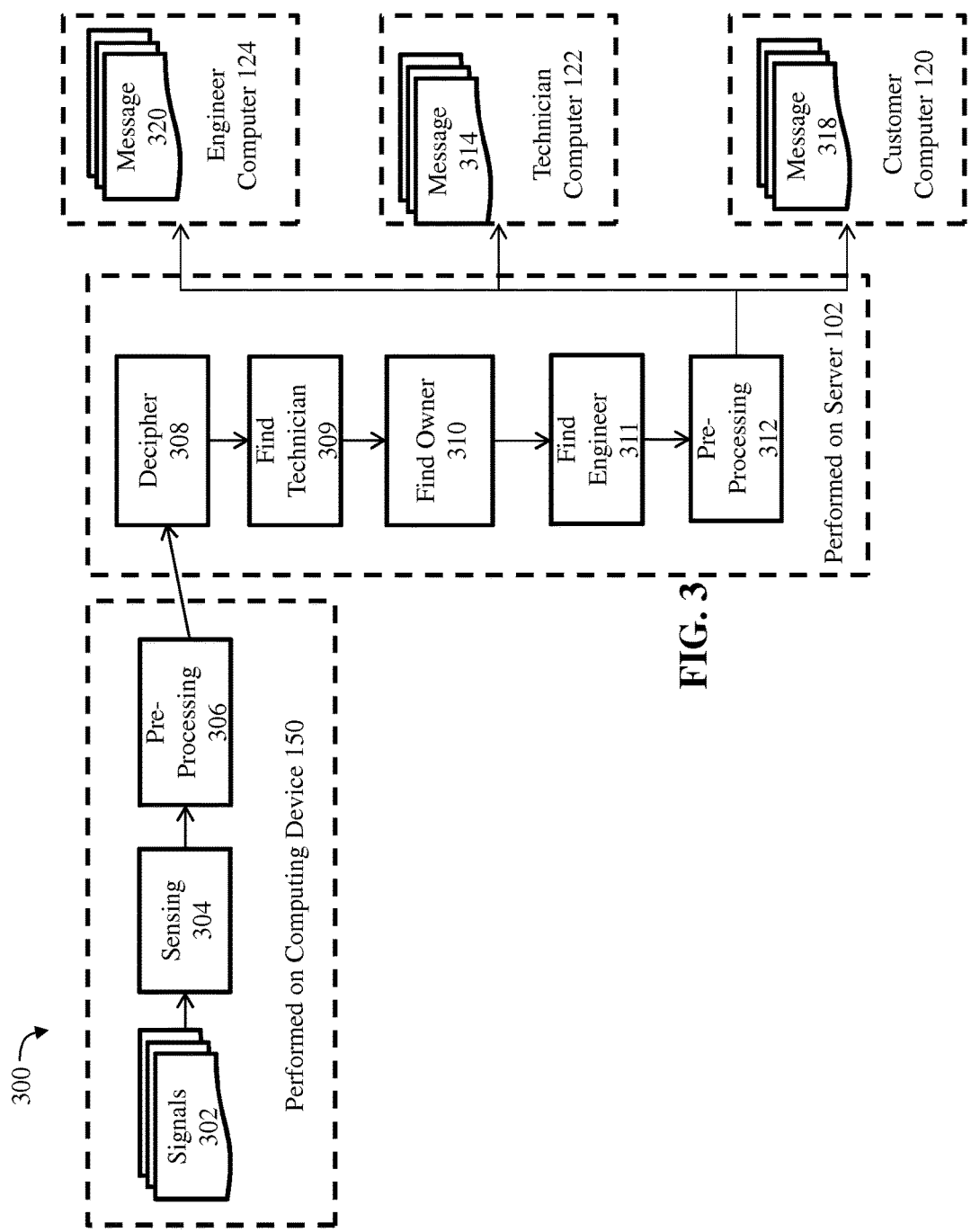
FIG. 3 is a block diagram showing the overall functions performed by the main components of the system for monitoring automobiles and facilitating maintenance and repair of such automobiles over the communications network, according to an example embodiment.

FIG. 3 is a block diagram showing the overall functions or processes 300 performed by the main components of the system 100 for monitoring automobiles and facilitating repair and service of such automobiles over the communications network 106, according to an example embodiment. FIG. 3 shows how computing device 150 collects sensor data from the ECU 165 of an automobile 160, sends the sensor data to server 102, which processes the sensor data and generates a service message that may be displayed for a technician 112 to view on his computer 122. The process starts with the emanation of signals 302 by the ECU 165 of an automobile 160. The signals 302 may include the blinking of lights, sensor data, troubleshooting messages, fault codes, or the like (as described above). Next, a sensing process 304, which may be implemented by sensors 202, 204, reads the signals 302. Then, based on the signals 302 that were sensed and the GPS and velocity data from the GPS module, device 150 performs pre-processing 306 on a message that is sent to the server 102. In one embodiment, pre-processing 306 may include encoding data into a message format ready for transmission to the server 102. The data encoded into the message may include the sensor data, as well as other data.

Next, the message is received by the server 102, which deciphers the message in step 308. This step may include reading the sensor data, GPS positional and velocity data and any other data included in the message. Next, in step 309, the server 102 finds the correct technician 112 based on the data included in the message. Optionally, in step 310, the server 102 finds the correct owner 110 based upon the data included in the message. Optionally, in step 311, the server 102 finds the correct engineer 114. After performing one or all of steps 309, 310 and 311, the server 102 then reads the contact information of one or all of the technician, customer and engineer it found in steps 309, 310, and 311 and performs pre-processing 312 on messages 314, 318 and 320, respectively, such that messages or alerts message 314 that is sent to the computer 122 of the technician 112, the computer device of the customer 120, and the computer 124 of the engineer 114. Pre-processing 312 may include encoding data into a message format ready for transmission to the computer 122 of the technician 112, the computer of the customer 120, and the computer 124 of the engineer 114. The data encoded into the message may include sensor data, as well as other data such as GPS positional and velocity data. The final result of process 300 is human readable data displayed on a screen or other computer display of computers of the technician 112, engineers 114 and consumer 110. In other embodiments, various combinations of excluding steps 309, 310 or 311 maybe used such that either messages 314, 318, or 320 are not transmitted to the computers of either the engineer, the technician or the customer. Note that the dotted lines and related text of FIG. 3 indicate which devices of environment 100, in one embodiment, perform the processes 300.

Figure 4A:
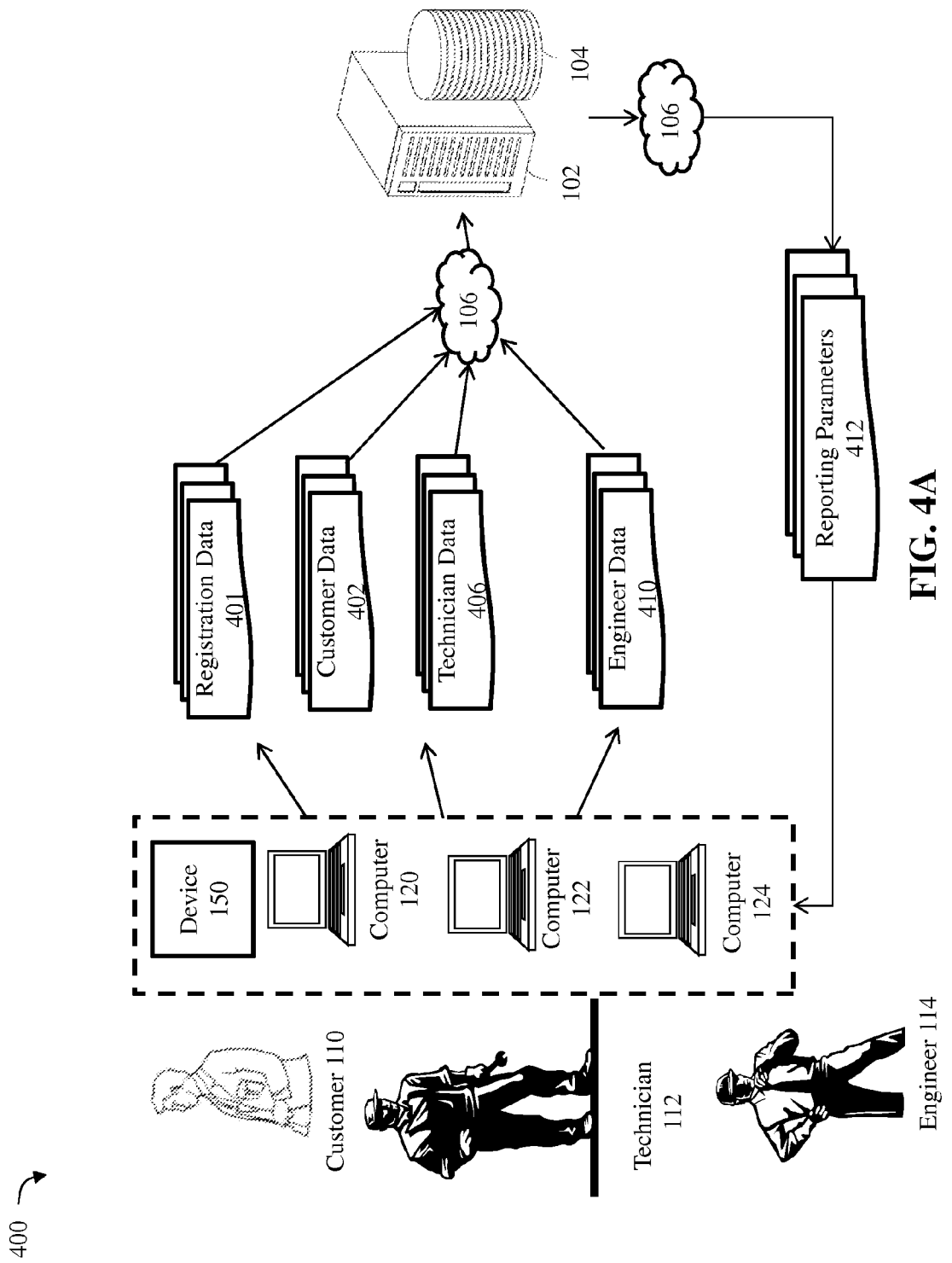
FIG. 4A is a diagram showing the data flow of the registration process over the communications network, according to an example embodiment.
Figure 4B:
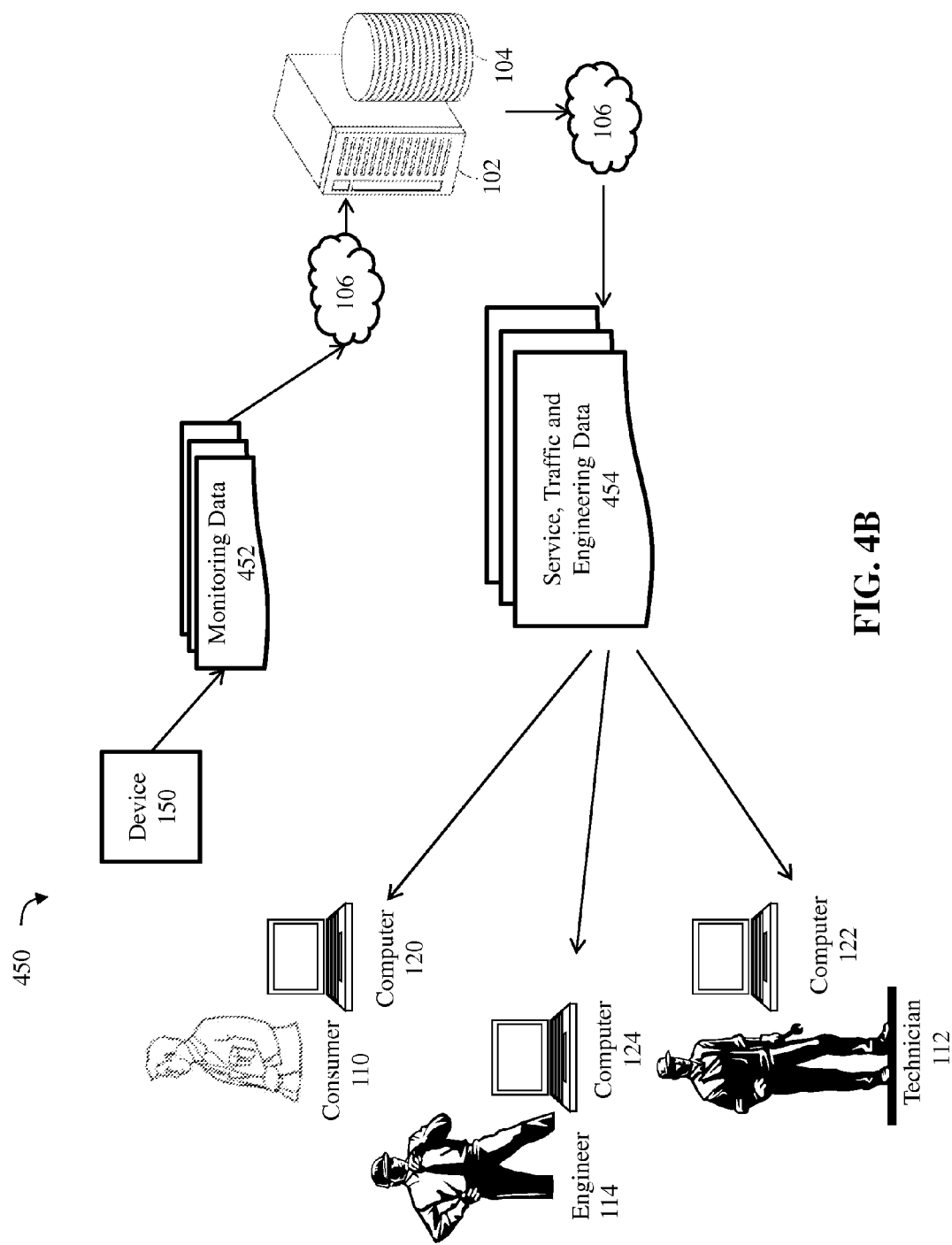
FIG. 4B is a diagram showing the data flow of the monitoring process over the communications network, according to an example embodiment.
Figure 5A:
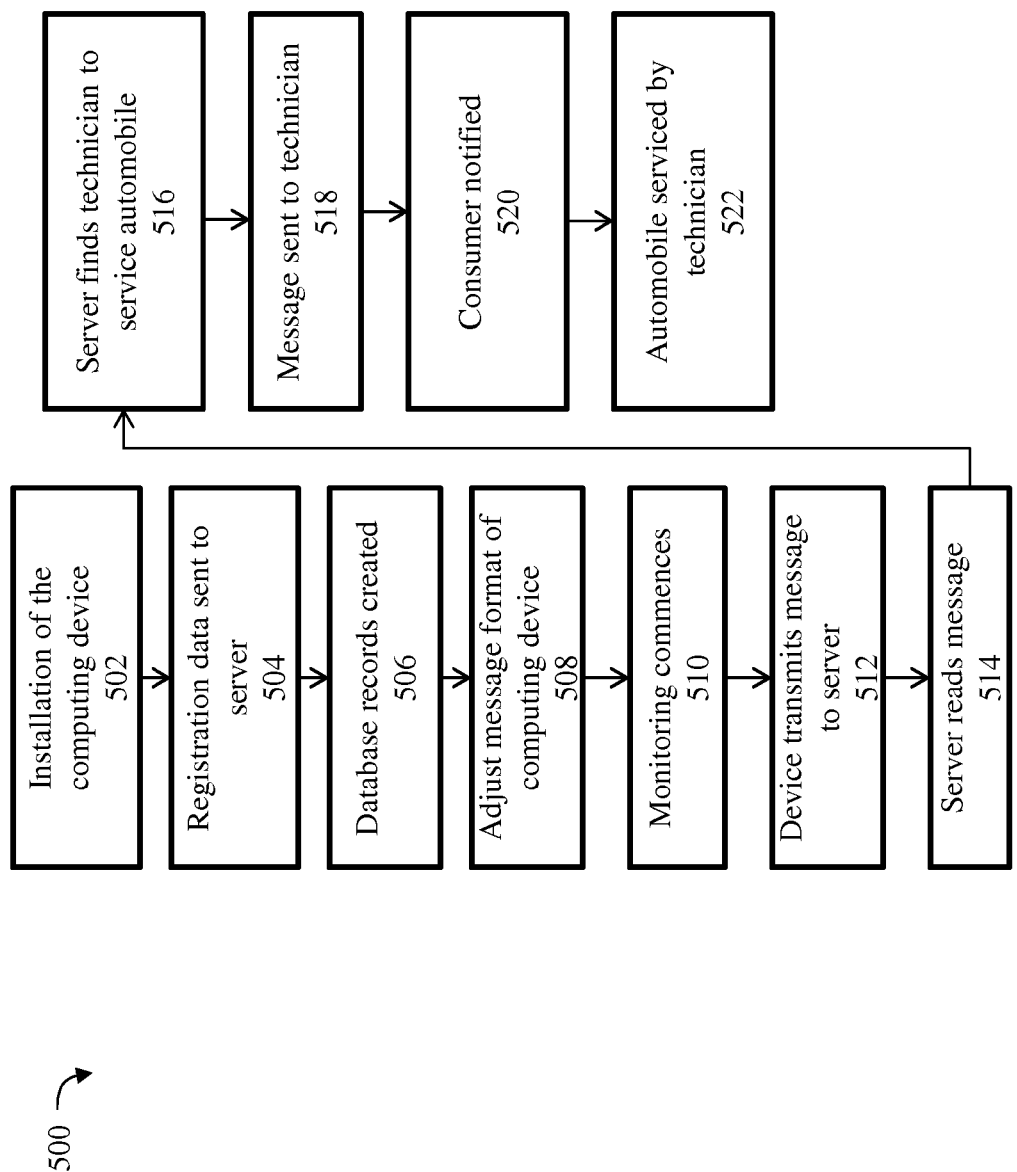
FIG. 5A is a flow chart showing the control flow of the process for monitoring automobiles and facilitating maintenance and repair of such automobiles over the communications network, according to an example embodiment.

FIGS. 5A, B and C is a flow chart showing the control flow of the process 500 for monitoring automobiles and facilitating servicing and repair of them over the communications network, according to an example embodiment. Processes 500, 550 and 575 describes the general steps that occur when a computing device 150 is installed and registered, and subsequently begins operation monitoring and initiating service for automobiles 160. The process 500 is described with reference to FIGS. 4A and 4B, wherein FIG. 4A shows the general data flow of the registration process 400 and wherein FIG. 4B shows the general data flow of the monitoring of automobiles, monitoring traffic data, and monitoring of engineering and advertising data process 450.

The process 500 begins with step 502 comprising the installation of the computing device 150, which may be a programmable logic controller, in relation to the automobile 160. As described above with respect to FIG. 2, the device 150 may be integral with the automobile 160. The device 150 may read signals, code, troubleshooting messages, or fault code from the ECU 165 of the automobile 160 and utilize sensor readings using sensors 204 and utilize GPS data from the GPS module 206. In another embodiment, the device 150 may be attached to the automobile 160 via a direct, wired data port connection such that the device 150 may read data from the automobile 160, as well as take sensor readings using sensors 204 and take positional and velocity data from GPS module 206.

In step 504, the device 150 performs a registration process. In one embodiment, the registration process is performed by the computer 122 of the technician 112 in conjunction with device 150. In this embodiment, the computer 122 connects to the device 150 either in a wired format, via a wired data port connection, or in a wireless format, using a wireless networking standard, such as Zig Bee, WiFi or Bluetooth. In another embodiment, the registration process is performed by the computer 120 of consumer 110 in conjunction with device 150. In yet another embodiment, the registration process is performed solely by the device 150, wherein on-device settings such as a WiFi password, can be input into the device 150 using a small screen or other I/O interface in the device 150. In another embodiment, a registration process can be performed by the computer 124 of engineer 114 in conjunction with device 124. The engineer 114 can register to receive information and data from the device 150 that can be used to improve the overall functionality of the automobile 160 or the functionality of any particular part device located within the automobile 160 and can be used to identify why a particular automobile part failed.

In step 504, the device 150 and/or computer 120, 122, 124 may send registration data 401 to the server 102. The registration data 401 may include any of the data included in an automobile record, as defined above, such as an automobile unique identifier, automobile owner contact information, an automobile message format, automobile sensor parameter data and a first automobile type. In one embodiment, certain ones of the registration data 401 may be predefined in the device 150 and therefore are not editable before transmission as registration data 401, such as automobile message format, automobile sensor parameter data and a first automobile type. In another embodiment, certain ones of the registration data 401 may be entered or defined by the consumer 110, technician 112, or engineer 114 in the computer 120, 122 or 124 before transmission as registration data 401, such as device owner contact information, technician contact information and engineer contact information.

In one optional embodiment, in step 504, the device 150 and/or computer 120, 122, 124, may send technician data 406 to the server 102. The technician data 406 may include any of the data that may be included in a technician record, as defined above. The technician data 406 corresponds to the technician 112 that has installed the computing device 150 in relation to the automobile 160. In another optional embodiment, in step 504, the device 150 and/or computer 124 may send engineer data 410 to the server 102. The engineer data 410 may include any of the data that may be included in an engineer record, as defined above. The engineer data 410 corresponds to the engineer 114 that has installed the computing device 150 in relation to the automobile 160.

Optionally, in step 506, the automobile record(s) associated with the automobile 160 is generated. In one alternative, the automobile record(s) the records may include the data of the corresponding technician record(s) or engineer record(s). In another alternative, the automobile record(s) may include a link to the technician record(s) or engineer record(s), such that it is predefined which technician or technicians are slated or assigned to service the automobile of the automobile record or which engineers or engineer(s) are slated or assigned to receive data regarding the failure and performance of the automobile parts and demographic information regarding the customer and their automobiles. In another alternative, the technician record(s) or engineer record(s) may include any of the data found in the corresponding automobile record(s), or the engineer or technician record(s) may include a link to the automobile record(s).

Optionally, in step 506, the system can be configured such that the engineer 114 only receives certain information such as failure rates, which parts failed, frequently failure, and other statistics, data and information that assist the engineer 114 to design, manufacture and optimize the overall automobile performance and automobile part performance. In other embodiments, information and data can also be used to create marketing campaigns, especially information pertaining to the demographics of owners and customers.

In optional step 508, the server 102 sends a message (such as embedded in 401) to the device 150 defining the data required by the server 102, i.e., the desired reporting parameters of the device 150. In response, the device 150 adjusts its message format parameters (as defined in the device record, described above) to reflect those defined in the message. I.e., the device 150 adjusts the monitoring data 452 it sends to reflect what the server 102 desires. Recall that the device 150 may include a multitude of sensors 202, 204 and a GPS module 206 and therefore may possess a multitude of sensor data and GPS velocity and positional data to report to server 102. But server 102 may not require all of the sensor data available, and therefore, in order to save bandwidth, processing and usage, the server 102 may specify the subset of data required by the server 102.

In step 510, the installation and registration procedures have concluded and the monitoring process begins. In step 512, the device 150 receives signals 302 from the device 150. The signals 302 may include the blinking of lights, sensor data, troubleshooting messages, fault codes, codes or the like (as described above). Also in step 512, the device 150 generates a message including monitoring data 452 and sends the message to the server 102. The monitoring data 452 may include any of the sensor data sensed by device 150, as well as additional data, such as an automobile unique identifier for the device 150, GPS positional and velocity data and environmental sensor data.

In one optional step after step 512, the message generated by device 150 is sent to a message queue or buffer pool server. This function of the message queue or buffer pool server is to buffer incoming messages faster than other servers can process in a timely fashion. The queuing or buffering process allows for greater scalability by allowing the server 102 to catch up to or start more server instances to process larger amounts of messages in parallel.

In step 514, the server 102 receives the message, unencodes or deciphers the message and reads the data in the message. The server 102 may read the automobile unique identifier in the message, and subsequently accesses an automobile record in the database 104 that matches the automobile unique identifier. Any of the data available in an automobile record may be accessed and read in this step. For example, in step 514, the server 102 reads from the automobile record the automobile owner contact information, automobile message format, automobile sensor parameter data and the first automobile type. Then, the server 102 reads the sensor data from the message according to the automobile message format and the automobile sensor parameter data.

In one embodiment, in step 514, the server 102 reads from the automobile record the table that defines what sensor data means. The map or table describes the reason for a malfunction or fault, including the malfunctioning part or component. For example, the chart may specify that the sensor data indicates that sparkplug is damaged, which requires the sparkplug to be replaced. Also, in step 514, the server 102 compares the sensor data from the message to the chart to determine the reason for the malfunction or fault. In another embodiment, in step 514 the server 102 reads from the map or table the severity indicator that indicates the severity or urgency of a problem exhibited by the automobile 160, as indicated in the message received from the device 150. A low severity indicator in the message may indicate that a notice should be sent to the technician 112 or the customer 110 either once or once every period of time, while a more severe emergency indicator in the message may indicate that a notice or alert should be sent to the technician 112 or the customer 110 periodically over a short period of time.

In step 516, the server 102 finds a technician to service the automobile 160 connected to device 150. The server 102 accomplishes this by accessing in the database 104 a technician record having an address in the technician contact information within a predefined area of an address of the automobile contact information, and having an automobile type that matches the first automobile type. That is, in step 516 the server 102 looks for a technician record with an address within a predefined range of the address of the customer 110 (i.e., the owner or customer contact information) and with an automobile type that matches the type of automobile 160 (i.e., the first device type). In one embodiment, this search is performed by a separate search server 180. In another embodiment, server 102 can look for a technician record with an address within a predefined range of the GPS location of the automobile connected to device 150. The server 102 locates the vehicle by reading the GPS data of the location of the automobile from the device message from the device 150 and by accessing in the databases 104 a technician having an address in the technician contact information with a predetermined area of the GPS location of the automobile, and having a first automobile type that matches the first automobile type.

In one alternative to step 516, the server 102 simply looks for technician contact information (or a link to a technician record) within the device record itself. This alternative is used in cases where it is predefined which technician or technicians are slated or assigned to service the automobile 160 of the automobile record. In another alternative to step 516, in order to determine whether a technician 112 qualifies as a match, the server 102 may access a scheduling or calendaring program of the technician 112 (wherein the scheduling or calendaring program includes the current work schedule or itinerary of the technician 112) to determine whether the technician 112 has any availability to service automobile 160. If the technician has no availability, then the technician 112 is not a match. If the technician has availability, then the technician 112 can be a match, provided that the address and skills of the technician 112 also match, as described above.

In step 518, the server 102 generates a message and sends the message to the computer 122 of technician 112. In this step, the message may include any of the sensor data, any of the data in the device record (such as first device type and device contact information), as well as the reason for the malfunction or fault, as determined by the server in step 514. In step 518, the message may be sent to the email address, telephone number or other address of the technician using the technician contact information in the technician record found in step 516. In step 522, the technician 112 services the automobile 160 connected to device 150.

Optionally, prior to servicing the automobile 160, the technician may contact the owner of owner or user of the automobile 160, by using the contact information associated with the device 150. Alternatively, as shown in step 520, the server 102 may contact, in an automated fashion, the owner of the home housing the device 150, such as by using email, text or an automated phone call. In this manner, the technician or server 102 may arrange for the customer to have the automobile serviced.

In an optional step before step 522, the server 102 may access a scheduling or calendaring program of the technician 112 to automatically place the servicing of automobile 160 directly into the scheduling or calendaring program of the technician 112, so as to ensure that the automobile 160 will be serviced timely.

Figure 5B:
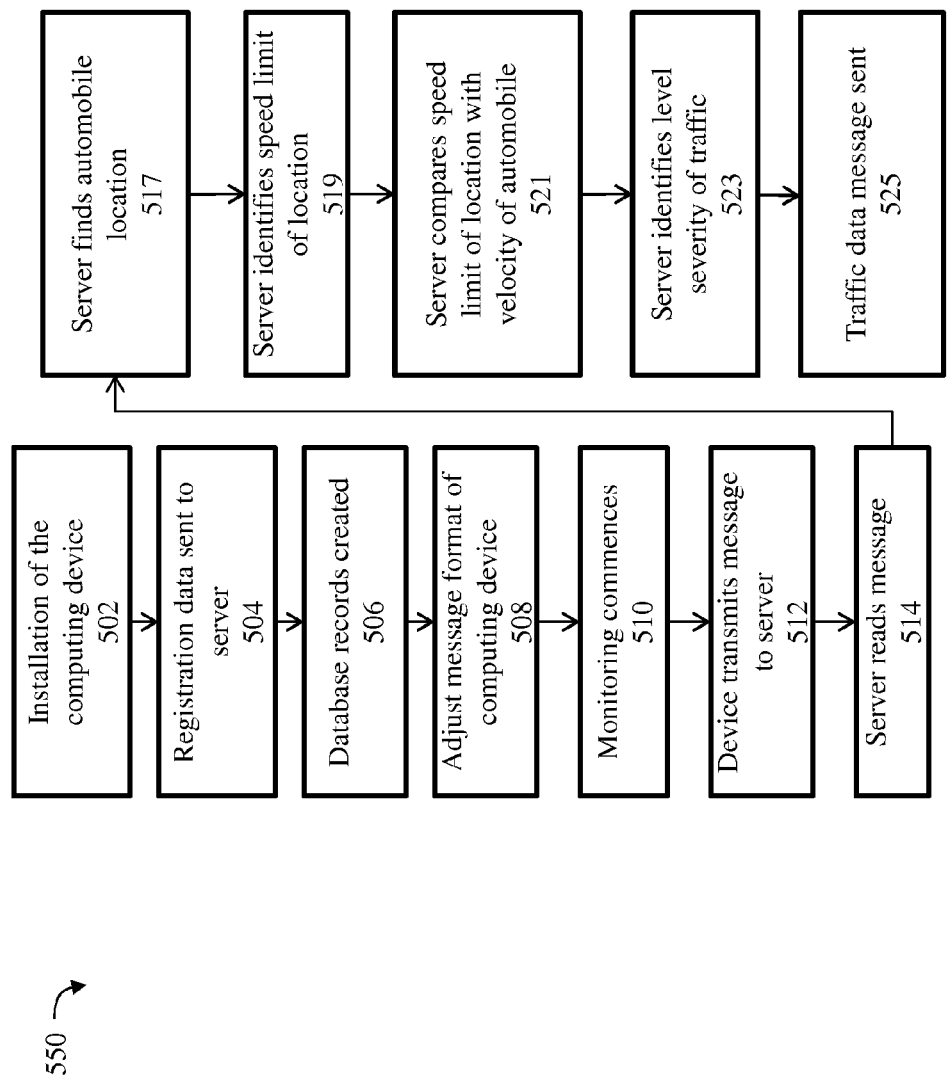
FIG. 5B is another flow chart showing the control flow of the process for monitoring automobiles and facilitating maintenance and repair of such automobiles over the communications network, according to an example embodiment.

FIG. 5B is a flowchart showing the control flow of the process 550 for monitoring the location of automobiles and determining the severity level of the traffic proximate to the location of the automobile. In steps 502 through step 508, the flow of the process can be the same. As mentioned above, in step 512, the device 150 can generate a message that includes GPS positional and velocity data. In step 514, the server receives the message, un-encodes or deciphers the message reads the data in the message, including the GPS location and velocity of the vehicle.

In another embodiment, the engineer 114 may be sent a notice or message on a periodic, i.e. monthly or quarterly basis, given that such data is meant for planning and not for repair. In yet another embodiment, the engineer 114 may be sent a notice or message more frequently when there is a more severe emergency indicator.

The database 104 includes roadmaps and the GPS coordinates and speed limits associated with the various thoroughfares, roads streets, etc. In step 517, the server 102 maps the location of the automobile after reading the GPS coordinates from the device message and comparing to the GPS coordinates in the database 104.

In step 519 the server identifies the speed limit of the road map location of the automobile. As explained above, the server 102 identifies and maps the location of the automobile and velocity of the automobile from the message from device 150. In step 521, the server 102 compares the velocity of the automobile with the speed limit of the location of the automobile. The server 102 can be configured to compare the velocity of multiple automobiles in the database at one point in time by performing steps 502-521.

In step 523, after the server 102 calculates the velocity of the vehicles on a particular roadway and compares such average with the speed limit of the roadway. The server 102 can identify the severity level of traffic and assign such severity level of traffic to the location of the automobile. The database 104 may include a map or table that defines or describes a severity level of traffic in a particular location based upon the average velocity of a certain predefined number of vehicles when compared to the speed limit of such location. For instance, if the speed limit of a particular location is 70 miles per hour and the average velocity of one or more automobiles in that same location is 0 mph, then the traffic may be defined as heavy traffic. In another example, if the speed limit of a particular location is 70 miles per hour and the average velocity of vehicles in that same location is 60 mph, then the traffic may be defined as light traffic. After the server identifies and assigns the level of traffic in a particular area, in step 525, the server 102 generates a message and sends the message to the computer 120 of the customers 110. In this step, the message may include the sensor data, the average velocity of automobiles on a particular roadway or area and a level of severity of traffic for a particular area or roadway. The message may be sent to the email address, telephone number or other address of the customers their respective contact record found in their records.

Optionally, other third parties can register to receive such messages. Such third parties contact information (such as name, address, telephone number, email address, GPS coordinates, etc.) can be stored in the database 104 on the server 106 in a record. Alternatively such information contact information can also be stored on server 180.

FIG. 5C is a flowchart showing the control flow of the process 575 for monitoring the location of automobiles and sending data to engineers to facilitate optimum design and performance of automobiles and automobile parts. In steps 502 through step 508, the flow of the process can be the same. Similar to above, in step 512, the device 150 can generate a message that includes carbon dioxide emissions, part failure rate, part performance rate, and other data that can be received from the sensors 202, 204 and 206. In step 514, the server 102 receives the message, un-encodes or deciphers the message and reads the data in the message. The server 102 can store the data in the message in the database 104. Or alternatively, such data can be stored on the network 106 or the on the server 180. In step 524, the server can compile such data in the database 104. In step 526, the server 104 can compare data over a predefined region.

Optionally, the server can send such data in a message to the engineer without compiling or comparing the data. After receiving the message on the computer 124, the engineer 114 can compare, compile and run various types of analytical and statistical programs that are known in the art to analyze the data received by the message acquired in process 575. The engineer can use the data to analyze the failure or success of automobiles and automobile parts in various predetermined areas to optimize and decrease the failure rate of such automobiles and automobile parts. Demographical information of the customers and technicians contained in the automobile record, on the database 104 may also be used to facilitate optimization of marketing campaigns.

Figure 6:
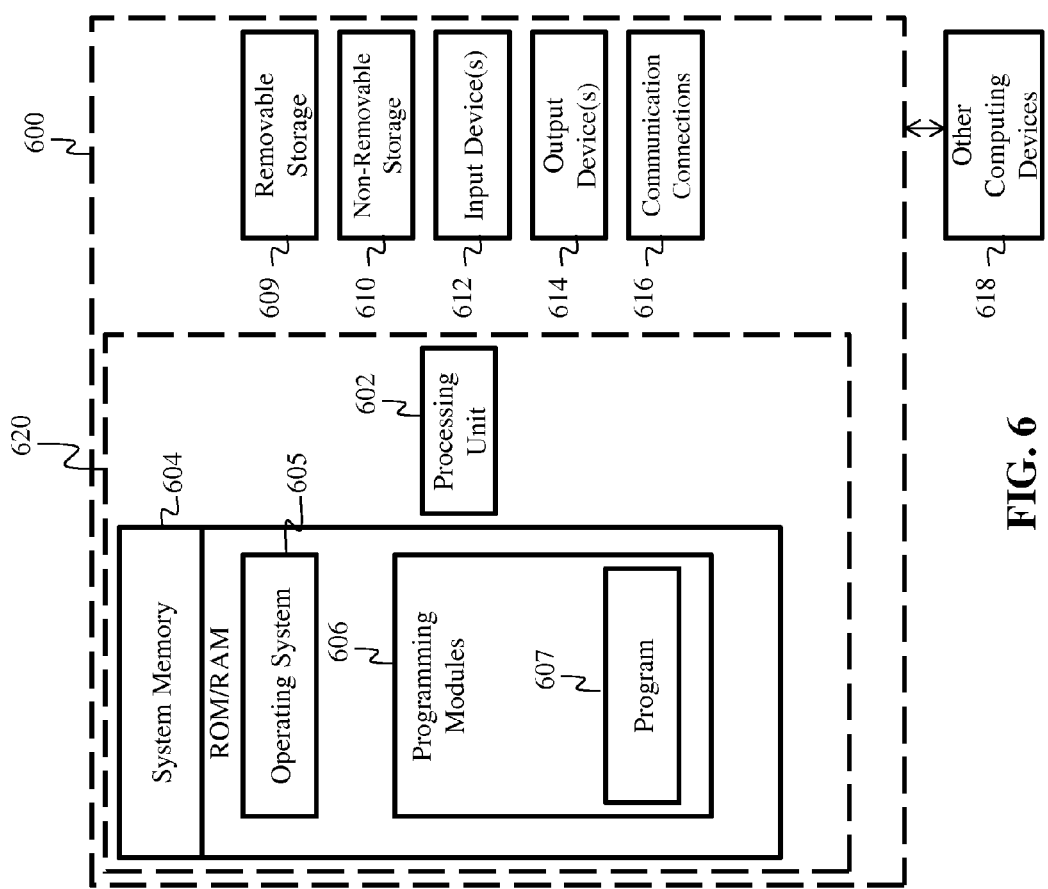
FIG. 6 is a block diagram of a system including a computing device, according to an example embodiment.

In one embodiment, the communications protocol used to send messages or data to and from computers 150, 180, 102, 120, 122 and 124 include any of the communications protocols known in the art, such as HTTP, TCP, UDP, ICMP, FTP, MQTT and IMAP. In another embodiment, the communications protocol used to send messages or data to and from computers 150, 180, 102, 120, 122 and 124 include any of the communications FIG. 6 is a block diagram of a system including an example computing device 600 and other computing devices. Consistent with the embodiments described herein, the aforementioned actions performed by computing device 150, server 102, and computers 120, 122 and 124 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for systems 100, 200 and processes 300, 400, 450, 500, 550 and 575 as described above. Processes 300, 400, 450, 500, 550 and 575 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation.

In one embodiment, programming modules 606 may include, for example, a program module 607 for executing the actions of server 102 and computing device 150, for example. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 500 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed system for providing monitoring of automobiles, comprising:
   1) a database connected to a communications network, the database comprising:
      a) a plurality of automobile records, wherein each automobile record includes an automobile unique identifier, automobile owner contact information, an automobile message format, and automobile sensor parameter data;
      b) a plurality of technician records, and, c) wherein each technician record includes technician contact information and a list of service skills possessed by the technician;
   2) a computing device connected to an engine control unit (ECU) of an automobile, the computing device comprising:
      a network interface device for connecting the computing device to the communications network;
      a sensor for detecting at least one signal from the ECU and generating corresponding sensor data;
      a processor for reading the sensor data from the ECU and transmitting a message over the communications network via the network interface device, wherein the message is formatted according to the automobile message format of the computing device and wherein the message includes the sensor data and an automobile unique identifier; and
   3) a server comprising:
      a network interface device for connecting the server to the communications network;
      a processor configured for: a) receiving the message from the computing device via the network interface device, b) reading the automobile unique identifier in the message, c) searching for and identifying an automobile record in the database that matches the automobile unique identifier, d) reading from the automobile record the automobile owner contact information, automobile message format, automobile sensor parameter data and a first automobile type, e) reading the sensor data from the message according to the automobile message format and the automobile sensor parameter data, f) searching for and identifying a technician record in the database having an address in the technician contact information within a predefined geographic area of an address of automobile contact information, having service skills that matches the first automobile type and having availability on the technician's calendaring program to service the automobile in a timely fashion, and g) sending, via the network interface device, a message to the technician using the technician contact information, wherein the message includes the sensor data, the first automobile type, and the automobile owner contact information, and placing an appointment on the technician's calendaring program to service the automobile in a timely fashion.

2. The distributed system of claim 1, wherein the computing device further includes at least one environmental sensor, wherein the at least one environmental sensor is for sensing environmental data associated with the automobile and generates corresponding sensor data.

3. The distributed system of claim 2, wherein an environmental sensor may comprise any one of a temperature sensor, a humidity sensor, a carbon monoxide sensor, a water sensor, a barometric pressure sensor, a moisture sensor, a velocity sensor and an acceleration sensor.

4. The distributed system of claim 3, wherein the sensor data includes a set of GPS data, a velocity of the automobile and a mileage of the automobile.

5. The distributed system of claim 1, wherein the database further includes a table associated with each automobile record, wherein the table maps sensor data to a description of a problem with the automobile, and a level of severity of the problem.

6. The distributed system of claim 5, wherein the database further includes a plurality of road map records, wherein each road map record includes a plurality of locations, wherein each location has a unique identifier and a speed limit associated with it, and wherein the table maps the GPS data of the automobile to a location on a road map and a level of severity of traffic associated with such location.

7. The distributed system of claim 5, wherein the processor is further configured for reading from the automobile record the table, identifying in the table a description of a problem with the automobile and a level of severity of the problem that corresponds to the sensor data read from the message, and sending, via the network interface device, a message to the technician using the technician contact information, wherein the message includes the sensor data, the first automobile type, the automobile owner contact information, the description of the problem with the automobile and the level of severity of the problem.

8. The distributed system of claim 7, wherein the processor is further configured for reading the GPS data, reading the velocity data of the automobile, mapping the GPS data of the automobile with a road map location, identifying the speed limit associated with the road map location of the automobile, comparing the velocity of the automobile with the speed limit of the road location, assigning a level of severity to the traffic at the road map location; and sending, via the network interface device, a message to the technician using the technician contact information, wherein the message includes the GPS location of the automobile and the level of severity of the traffic at such GPS location.

9. A distributed system for providing monitoring of automobiles, comprising:
   1) a database connected to a communications network, the database comprising:
      a) a plurality of automobile records, wherein each automobile record includes an automobile unique identifier, an automobile location, and a first automobile type; and,
      b) a plurality of technician records, wherein each technician record includes technician contact information and a list service skills possessed by the technician;
   2) a computing device connected to the automobiles, the computing device comprising:
      a network interface device for connecting the computing device to the communications network;
      a sensor for detecting at least one signal from an ECU and generating corresponding sensor data;
      a processor for reading the sensor data from the sensor and transmitting a message over the communications network via the network interface device, wherein the message is formatted according to a message format of the computing device and wherein the message includes the sensor data, and an automobile unique identifier; and
   3) a server comprising:
      a network interface device for connecting the server to the communications network; and
      a processor configured for: a) receiving the message from the computing device via the network interface device, b) reading the automobile unique identifier in the message, c) searching for and identifying a automobile record in the database that matches the automobile unique identifier, d) reading from the automobile record the automobile location and the first device type, e) reading the sensor data from the message, f) searching for and identifying a technician record in the database having an address in the technician contact information within a predefined geographic area of the automobile location, having service skills that matches the first type and having availability on the technician's calendaring program to service the automobile in a timely fashion, and g) sending, via the network interface device, a message to the technician using the technician contact information, wherein the message includes the sensor data, the first automobile type and the automobile location, and placing an appointment on the technician's calendaring program to service the automobile in a timely fashion.

10. The distributed system of claim 9, wherein the computing device further includes at least one environmental sensor, wherein the at least one environmental sensor is for sensing environmental data associated with the automobile.

11. The distributed system of claim 10, wherein an environmental sensor may comprise any one of a temperature sensor, a humidity sensor, a carbon monoxide sensor, a water sensor, a barometric pressure sensor, a moisture sensor, a velocity sensor and an acceleration sensor.

12. The distributed system of claim 11, wherein the sensor data includes a set of GPS data, a velocity of the automobile and a mileage of the automobile.

13. The distributed system of claim 9, wherein the database further includes a table associated with each automobile record, wherein the table maps sensor data to a description of a problem with the automobile.

14. The distributed system of claim 10, wherein the table maps sensor data to a description of a problem with the automobile and a level of severity of the problem.

15. The distributed system of claim 14, wherein the database further includes a plurality of road map records, wherein each road map record includes a plurality of locations; wherein each of the locations has a unique identify and a speed limit associated with it, and wherein table further maps the GPS data of the automobile to a location on a road map and level of severity of traffic.

16. The distributed system of claim 14, wherein the processor is further configured for reading from the automobile record the table, identifying in the table a description of a problem with the automobile and a level of severity of the problem that corresponds to the sensor data read from the message, and sending, via the network interface device, a message to the technician using the technician contact information, wherein the message includes the sensor data, the first automobile type, the automobile location, and the description of the problem with the automobile system and the level of severity of the problem.

17. The distributed system of claim 15, wherein the processor is further configured for reading the GPS data; reading the velocity data of the automobile; mapping GPS location of the automobile with a road map location; identifying the speed limit associated with the road map location; comparing the velocity of the automobile with the speed limit of the road location; assigning a level of severity to the traffic at the road map location; and sending, via the network interface device, a message to the technician using the technician contact information, wherein the message includes the GPS location of the automobile and the level of severity of the traffic at such GPS location.

18. A distributed system for providing monitoring of automobiles, comprising:
   1) a database connected to a communications network, the database comprising:
      a) a plurality of automobile records, wherein an automobile record includes an automobile unique identifier, an automobile location, a first automobile type and a table associated with each automobile record, wherein the table maps sensor data to a description of a problem with the automobile, b) a plurality of technician records, wherein each technician record includes technician contact information and a list of service skills possessed by the technician, c) a plurality of road map records, wherein each road map record includes a plurality of locations, wherein each location has a unique identifier and a speed limit associated with it;

2) a computing device connected to the automobile, the computing device comprising:
  a network interface device for connecting the computing device to the communications network;
  a sensor for detecting signals emanating from an ECU and generating corresponding sensor data;
  an environmental sensor located adjacent to the automobile, wherein the at least one environmental sensor for sensing environmental data associated with the automobile and generating corresponding sensor data;
  a processor for reading the sensor data from the sensor and transmitting a message over the communications network via the network interface device, wherein the message is formatted according to a message format of the computing device and wherein the message includes the sensor data and an automobile unique identifier; and 3) a server comprising:
  a network interface device for connecting the server to the communications network; and
  a processor configured for: a) receiving the message from the computing device via the network interface device, b) reading an automobile unique identifier in the message, c) searching for and identifying an automobile record in the database that matches the automobile unique identifier, d) reading from the automobile record the automobile location, the first automobile make, model, location and the table, e) reading the sensor data from the message, f) identifying in the table a description of a problem with automobile that corresponds to the sensor data read, g) reading the GPS data and velocity data of the automobile, h) mapping GPS location of the automobile with a road map location, i) identifying the speed limit associated with the road map location, j) comparing the velocity of the automobile with the speed limit of the road location, k) assigning a level of severity to the traffic at the road map location, l) searching for and identifying a technician record in the database having an address in the technician contact information within a predefined geographic area of the location of the automobile, having service skills that matches the first automobile type and having availability on the technician's calendaring program to service the automobile in a timely fashion, and m) sending, via the network interface device, a message to the technician using the technician contact information, wherein the message includes the sensor data, the first automobile type, the description of the problem with the automobile, the automobile location, and the level of severity of the traffic at the road map location, and placing an appointment on the technician's calendaring program to service the automobile in a timely fashion.

19. The distributed system of claim 18, wherein an environmental sensor may comprise any one of a temperature sensor, a humidity sensor, a carbon monoxide sensor, a water sensor, a barometric pressure sensor, a moisture sensor, a velocity sensor and an acceleration sensor.

20. The distributed system of claim 19, wherein the table maps sensor data to a description of a problem with the automobile to a level of severity of the problem, and wherein the table further maps GPS data of the location of the automobile to a location on a road map and level of severity of traffic.

* * * * *